US007542907B2

(12) United States Patent
Epstein et al.

(10) Patent No.: US 7,542,907 B2
(45) Date of Patent: Jun. 2, 2009

(54) BIASING A SPEECH RECOGNIZER BASED ON PROMPT CONTEXT

(75) Inventors: Mark E. Epstein, Katonah, NY (US); James R. Lewis, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1083 days.

(21) Appl. No.: 10/741,465

(22) Filed: Dec. 19, 2003

(65) Prior Publication Data

US 2005/0137868 A1 Jun. 23, 2005

(51) Int. Cl.
*G10L 15/22* (2006.01)
*G10L 15/14* (2006.01)
(52) U.S. Cl. ...................... 704/275; 704/251
(58) Field of Classification Search ................. 704/251, 704/255, 257, 275
See application file for complete search history.

(56) References Cited

U.S. PATENT DOCUMENTS

| | | | |
|---|---|---|---|
| 5,503,560 | A | 4/1996 | Stentiford |
| 5,553,119 | A | 9/1996 | McAllister et al. |
| 5,638,425 | A | 6/1997 | Meador, III et al. |
| 5,719,921 | A | 2/1998 | Vysotsky et al. |
| 6,073,097 | A | 6/2000 | Gould et al. |
| 6,094,476 | A | 7/2000 | Hunt et al. |
| 6,125,341 | A | 9/2000 | Raud et al. |
| 6,246,986 | B1 | 6/2001 | Ammicht et al. |
| 6,346,894 | B1 | 2/2002 | Connolly et al. |
| 6,377,662 | B1 | 4/2002 | Hunt et al. |
| 6,377,922 | B2 | 4/2002 | Brown et al. |
| 6,385,304 | B1 | 5/2002 | Hunt et al. |
| 6,522,726 | B1 | 2/2003 | Hunt et al. |
| 6,539,078 | B1 | 3/2003 | Hunt et al. |
| 6,622,119 | B1 * | 9/2003 | Ramaswamy et al. .......... 704/9 |
| 2003/0144978 | A1 * | 7/2003 | Zeine .......................... 706/47 |

FOREIGN PATENT DOCUMENTS

| | | |
|---|---|---|
| WO | WO 95/28790 | 10/1995 |
| WO | WO 02/09094 | 1/2002 |

OTHER PUBLICATIONS

Satoshi Sekine et al. "A Corpus-based Probabilistic Grammar with Only Two Non-terminals", Proc. Fourth International Workshop on Parsing, 1995.*
Wikipedia, "Transformational grammar".*
Wikipedia, "Transformational Grammar", Jan. 3, 2008.*
Bahl, L.R., et al., "Next Word Statistical Predictor In Correspondence", IBM Technical Disclosure Bulletin, vol. 27, No. 7A, pp. 3941-3942, Dec. 1984.
Hirose, K., et al., "N-Gram Language Modeling of Japanese Using Prosodic Boundaries", University of Tokyo. Int'l Speech Comm. Assoc, Speech Prosody 2002, p. 395-398.

* cited by examiner

*Primary Examiner*—Talivaldis I Smits
(74) *Attorney, Agent, or Firm*—Novak Druce + Quigg (57) ABSTRACT

A method, a system, and an apparatus biasing a speech recognizer based on prompt context. The present invention is capable of analyzing the words used in the prompt given to the user. Then, a set of words the user is likely to say in response to the prompt is determined. The word set may be determined using a technology used by the speech recognition system, such as n-grams, grammars, or both. The speech recognition system boosts the probabilities of the analyzed words in the word set by a preconfigured amount. The preconfigured amount is selected based on collected data.

47 Claims, 4 Drawing Sheets

BIASING A SPEECH RECOGNIZER BASED ON PROMPT CONTEXT

BACKGROUND

1. Field of the Invention

The present invention relates to the field of speech recognition and, more particularly, to speech-based user interfaces.

2. Description of the Related Art

Conventional data processing systems frequently incorporate speech-based user interfaces to provide users with speech access to a corpus of data stored and managed by a data processing system. To adequately process user requests or queries, however, a speech recognition system must have the ability to recognize particular words that are specified within the corpus of data, and therefore, words that likely will be received as part of a user request.

Studies have shown, however, that within the context of a conversational speech recognition system, users tend to vary their replies based upon the particular prompt to which the users are responding. More particularly, users tend to repeat words from the prompt when responding. For example, if a user is asked "do you want to A, B, or C", there is an increased likelihood that the user will say something like "I want to A." Similarly, if the user is prompted "would you like to A, B, or C", there is an increased likelihood that the user will respond with "I would like to A" or "I'd like to A."

Taking another example, if a user is prompted to choose between two mutual funds, there is an increased likelihood that the user will pick one of the two offered choices. A mutual fund grammar or a language model is likely to be used in recognizing the user's response. While such mechanisms reflect the probabilities that particular words will be spoken by the user, the probabilities are determined through an empirical study of a text corpus with little or no concern over the particular questions asked to obtain user responses. Such mechanisms typically are used in a global sense within speech systems. In directed dialog systems like VoiceXML, the program that generates the prompt also returns the grammars used on the next turn to decode the prompt. However, in conversational systems that separate the recognition (i.e. statistical language models or grammars) from the prompt generation (i.e. automatically generated or hand crafted), it is desirable to have a method for adapting the speech recognition model being used according to the text of the prompt played to the user as well as any expected user responses.

With respect to grammar-based systems and development, the grammar developer may be different from the prompt developer thereby causing a disconnect with respect to incorporating feedback from the prompts to the grammars. But even in systems where the prompt and grammar are kept in sync, like VoiceXML, it takes extra development effort to generate the grammars customized to each prompt. Systems can incur extra run-time overhead, which could impact high call volume applications. In these cases, it would be preferable to have a single grammar that remains unchanged, and another having the probabilities of the rules to bias the grammar adjusted in favor of what the user is likely to say in response to the prompt.

Accordingly, it would be beneficial to bias probabilities of speech recognition systems in favor of predicted user responses.

SUMMARY OF THE INVENTION

The present invention provides a method, a system, and an apparatus for biasing a speech recognizer based on prompt context. More specifically, the present invention is capable of biasing the speech recognizer's speech grammars and/or language models to increase the recognition accuracy for the likely responses to a prompt.

In general, the present invention provides a method of biasing a speech recognizer based on prompt context. The bias does not require the subsystem generating the prompt to provide any information for this to take place, which is what is usually done. The speech recognition system analyzes the words used in the prompt given to the user. Then, the system determines the set of words the user is likely to say in response to the prompt. The word set may be determined using the strategy (or technology) used next by the speech recognition system, such as n-grams, grammars, or both. Then, the system boosts the n-grams in the n-gram model or the appropriate rules in the grammars in order to increase the likelihood of what the user is likely to say in their response to the prompt, by a preconfigured amount. The preconfigured amount may be changed dynamically as additional data is collected.

More particularly, in one embodiment, the present invention provides a method for biasing a speech recognizer based on prompt context including the steps of analyzing words used in the prompt given to a user; determining a response set comprising words the user may use when responding to the prompt, wherein the word set is determined using a speech recognition system strategy; and boosting the probabilities of the responses in the response set such that a speech recognizer of the speech recognition system has an increased likelihood of recognizing a response from the user.

More particularly, in another embodiment, the present invention provides a machine-readable storage having stored thereon, a computer program having a plurality of code sections, executable by a machine, for causing the machine to perform the steps of analyzing words used in the prompt given to a user; determining a response set comprising words the user may use when responding to the prompt, wherein the word set is determined using a speech recognition system strategy; and boosting the probabilities of the responses in the response set such that a speech recognizer of the speech recognition system has an increased likelihood of recognizing a response from the user.

In yet another embodiment, the present invention provides a system for biasing a speech recognizer based on prompt context including means for analyzing words used in the prompt given to a user; means for determining a response set comprising words the user may use when responding to the prompt, wherein the word set is determined using a speech recognition system strategy; and means for boosting the probabilities of the responses in the response set such that a speech recognizer of the speech recognition system has an increased likelihood of recognizing a response from the user.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present invention provides a method, a system, and an apparatus for biasing a speech recognition system based on prompt context. More specifically, the present invention biases the probabilities of language models and/or grammars for recognizing user responses based upon the prompt given to the user. The present invention increases efficiency of speech recognition systems while still maintaining accuracy.

Many users of speech-based user interfaces will vary their response based upon the prompt given to them. This variance affects conversational speech recognition systems based upon an n-gram language model ("LM"). This user variance may affect conversational speech recognition systems using grammars as well. For example, if a user is prompted for a fidelity fund that they would like to sell as part of a transfer, and two choices are provided, it is very likely that the user will pick one of the two. However, normally the same FUND grammar is likely to be used for the speech recognition system on the next turn as dynamically generating this grammar can be computationally expensive. There may be additional difficulties that arise if the prompt developer is different from the grammar developer. However, by biasing the probabilities the of the specific fund names noted in the prompt within the general FUND grammar, many of these difficulties can be avoided.

The present invention biases the probabilities in the speech recognizer by increasing the weight or probability of receiving, as a user response, those words, keywords, or phrases specified in the prompt given to the user. As such, regardless of the technology that is being used to decode the next utterance by the user, the present invention helps ensure that the utterance will correctly recognize the response from the user. The present invention may be used with an n-gram LM, grammars, and/or an n-gram LM with embedded grammars.

When used in an n-gram LM system, the present invention analyzes the prompt and creates n-grams from the words of the prompt. This effectively increases the counts of these n-grams in the n-gram LM used by the speech recognition system in the next turn. It is also possible to make a separate "mini LM" out of one sentence, and weight this sentence using lambdas with the base LM. Thus, phrases like "I do" and "I would" (and associated contractions, such as "I'd") would receive higher probabilities because of the unigram probabilities for "do" and "would."

When used in a grammar-based system, the present invention is capable of examining which grammar will be used for the next turn. This grammar may then be used to parse all $n*(n+1)/2$ substrings in the set of allowable responses to a prompt (where "n" is the number of words in the sentence) to determine if any grammar examples are or can be used in response to the prompt. The rules that are used in parsing these $n*(n+1)/2$ substrings may have their weights temporarily increased for one turn. As such, it is possible to keep the base grammar unchanged, but boost the probabilities for what the user is likely to say. In some embodiments, it may be beneficial to regenerate a new grammar. However, in other embodiments, such as for dollar amounts, it would not be beneficial to generate new grammars dynamically.

In a system using an n-gram LM with embedded grammars, there are additional complexities that arise other than those associated with only an n-gram LM system or a grammar system. One additional complexity is that a user may reply with an utterance somewhat arbitrarily making prediction of a suitable grammar for speech recognition difficult. Therefore, it would be beneficial to ascertain the classes available to be used within the set of allowable responses to the prompt. The present invention attempts to ascertain these classes using a variety of different techniques. It may be possible for the system to determine these classes from the dialog context. If not, then another option would be for the speech recognition system to process the allowable responses using the n-gram LM with grammars to determine those grammars that have the highest probability of being used according to the LM. Lastly, the system may try all $n*(n+1)/2$ n-grams against all the grammars.

Accordingly, in general, the present invention biases the speech recognition system by determining one or more words a user of the system is likely to say in response to a prompt. This set may be defined as "R(prompt)". R(prompt) may be entire sentences, a set of n-grams, or likely grammar choices. The data computed by R(prompt) is then used to boost the speech recognition probabilities, regardless of the technology being used to decode the next utterance (n-gram LM, grammars, and/or an n-gram LM with embedded grammars).

In another embodiment, the present invention may also be used for Voice Extensible Markup Language (VoiceXML) systems. In this embodiment, R(prompt) is a grammar and the probabilities computed by this grammar, rather than being used to boost the probabilities of a base grammar, are instead used to replace the probabilities. Thus, for VoiceXML, the present invention uses the likely replies to a prompt to bias an existing system to a preconfigured amount: Grammar Prompts=1.0*R(prompt)+0.0*Base Grammar.

In one embodiment, the present invention boosts the probabilities of the current grammar. this may be accomplished by: processing each of the phrases in R(prompt) through the base grammar, and accumulating counts of how often each choice in a rule is used. Notably, R(prompt) can include weights if desired. Next, for each rule, a new probability for each choice of the rule can be created by normalizing the counts. Then, the new probabilities for a rule can be interpolated with the original probabilities for the rule from the original grammar. For example, the system can ask the user "would you like to withdraw your money?" R(prompt) can be determined to contain the phrases "withdraw my money", "I would like to withdraw my money", and "we would like to withdraw our money", with probabilities 0.25, 0.50, and 0.25 respectively.

In a grammar-based system, there can be rule called <prefix> that has 5 rules, each with 0.20 probability: <prefix>=I would like to|we would like to|I want to|may I please|can I. Also, the grammar can require the user to say a prefix. For example:

<sentence>=<prefix><action><money>.
    <action>=withdraw|deposit.
    <money>=my? money.

Then in a first step, when the phrases in R(prompt) are processed, by the grammar, only the 2nd and 3rd phrases in R(prompt) are parsable by the grammar. The grammar does not allow "withdraw my money", since this requires an empty prefix.

The first <prefix> rule would be weighted count 0.5, and the second would be weighted count 0.25 when the parsing of the phrases in R(prompt) is done. This occurs because of the weights in R(prompt). Once normalized, in a second step, the probability of the choices in the <prefix> rule are 0.66 for "I would like to", 0.33 for "we would like to", and 0.0 for the other 3 choices. In a third step, interpolation can be performed using lambda to be:

\<Prefix\>=I would like to|(prob=0.20*lambda+(1−lambda) *0.66)
we would like to|(prob=0.20*lambda+(1−lambda)*0.33)
I want to|(prob=0.20*lambda)
may I please|(prob=0.20*lambda)
can I|(prob=0.20*lambda)

Generally, the 2 sets or probabilities, the original ones with 0.20 for each entry, were interpolated with the new probabilities computing by normalizing the weighted counts from processing the weighted prompts R(prompt) with the grammar.

Unlike an embodiment incorporating grammar induction, in this embodiment, a new grammar is created from everything in R(prompt) that is a subset of the initial grammar. This new grammar can allow, however, too many extra words or phrases, and thus, poorly bias the speech recognition system. The present invention provides a method to adapt the grammars of what has already been determined to be an allowable response. That is, what a user is likely to say, i.e. R(prompt), can be determined, and a grammar based upon the prompt, or G(prompt), that is consistent with the original base grammar, (G(base)), can be determined. G(prompt) and G(base) then can be interpolated.

As mentioned, R(prompt) may be used to create a G(prompt), which is then rulewise interpolated with G(base). This approach may also be used with an LM. For example, LM(prompt), which is an LM that is based upon likely responses, can be created. Then LM(prompt) can be interpolated with LM(base). Note that LM(prompt) is not just an LM created from all the phrases in R(prompt) for 2 reasons: 1) the phrases in R(prompt) are weighted; and 2) there may be phrases that use words for which no baseforms exist in the system, such that it may be beneficial to exclude those words and renormalize.

Figure 1:
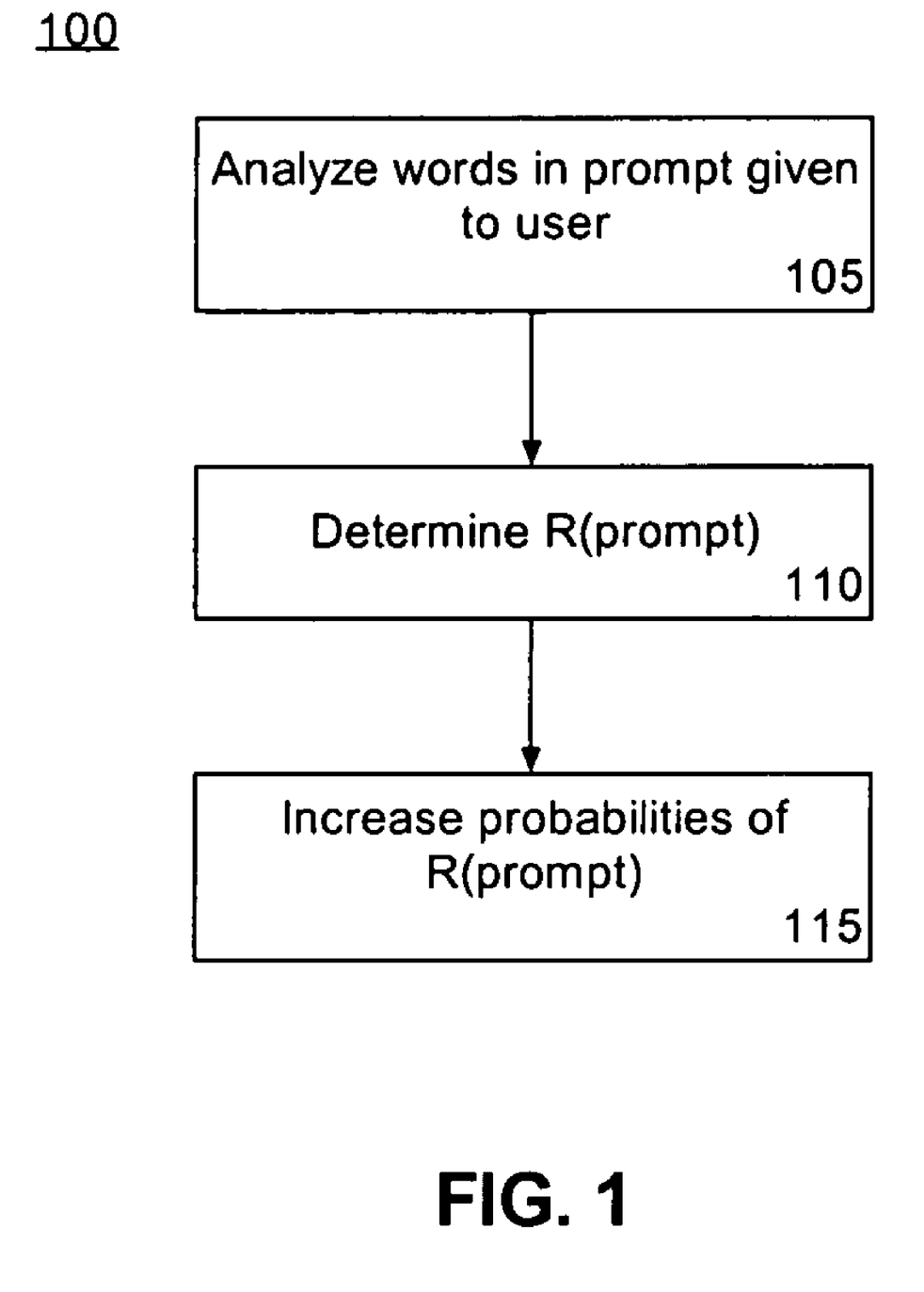
FIG. 1 is a flow chart illustrating a method for biasing a speech recognizer based on prompt context in accordance with the inventive arrangements disclosed herein.

FIG. 1 is a flow chart illustrating a method 100 for biasing a speech recognizer based on prompt context in accordance with one embodiment of the present invention. The method 100 may begin in step 105 where the speech recognition system analyzes the words used in the prompt given to the user. Then, in step 110, the system determines R(prompt). R(prompt) is determined using the strategy (or technology) used next for the speech recognition system. As previously discussed, this can be a strategy or technique using n-grams, grammars, or both.

Then, in step 115, the system will boost the probabilities of R(prompt) the n-gram LM and/or grammars by a preconfigured amount. The preconfigured amount may be changed dynamically as additional data is collected. By boosting the probabilities, the speech recognizer is more likely to recognize the user's response to the prompt, thereby making the speech recognition system more accurate.

Figure 2:
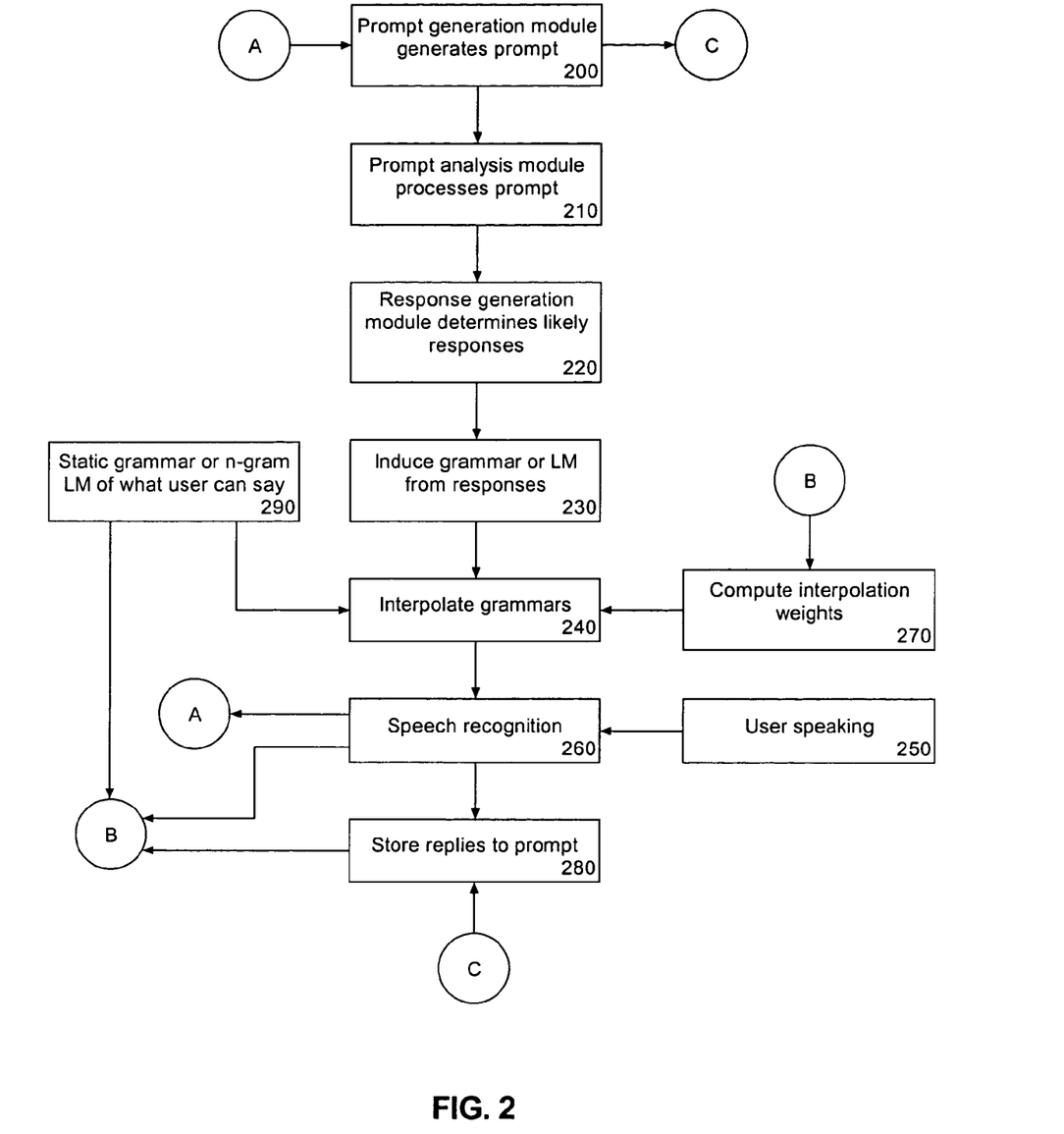
FIG. 2 is a flow chart illustrating a method for biasing a speech recognizer based on prompt context in accordance with another embodiment of the present invention.

FIG. 2 is a flow chart illustrating a method for biasing a speech recognizer based on prompt context in accordance with another embodiment of the present invention. The method may begin in step 200 wherein the prompt generation module generates a prompt for the user. Then, in step 210, a prompt analysis module processes the prompt and, in step 220, a response generation module determines responses the user might say in response to the prompt generated in step 200.

In step 230, the system induces a grammar or a LM from these responses. In step 240, the system determines an interpolation grammar that is used by the system such that when the user speaks, step 250, the system has an increased likelihood of recognizing the speech in step 260. The interpolation grammar interpolates using interpolation weights 270 and a static grammar or n-gram LM of things the user might say 290. At that point, the method may return to step 200. The system also stores the prompt and replies to the prompt recognized by the system at 280. Additionally, after speech recognition 260, the interpolation weights may be adjusted based upon the recognized response.

Figure 3:
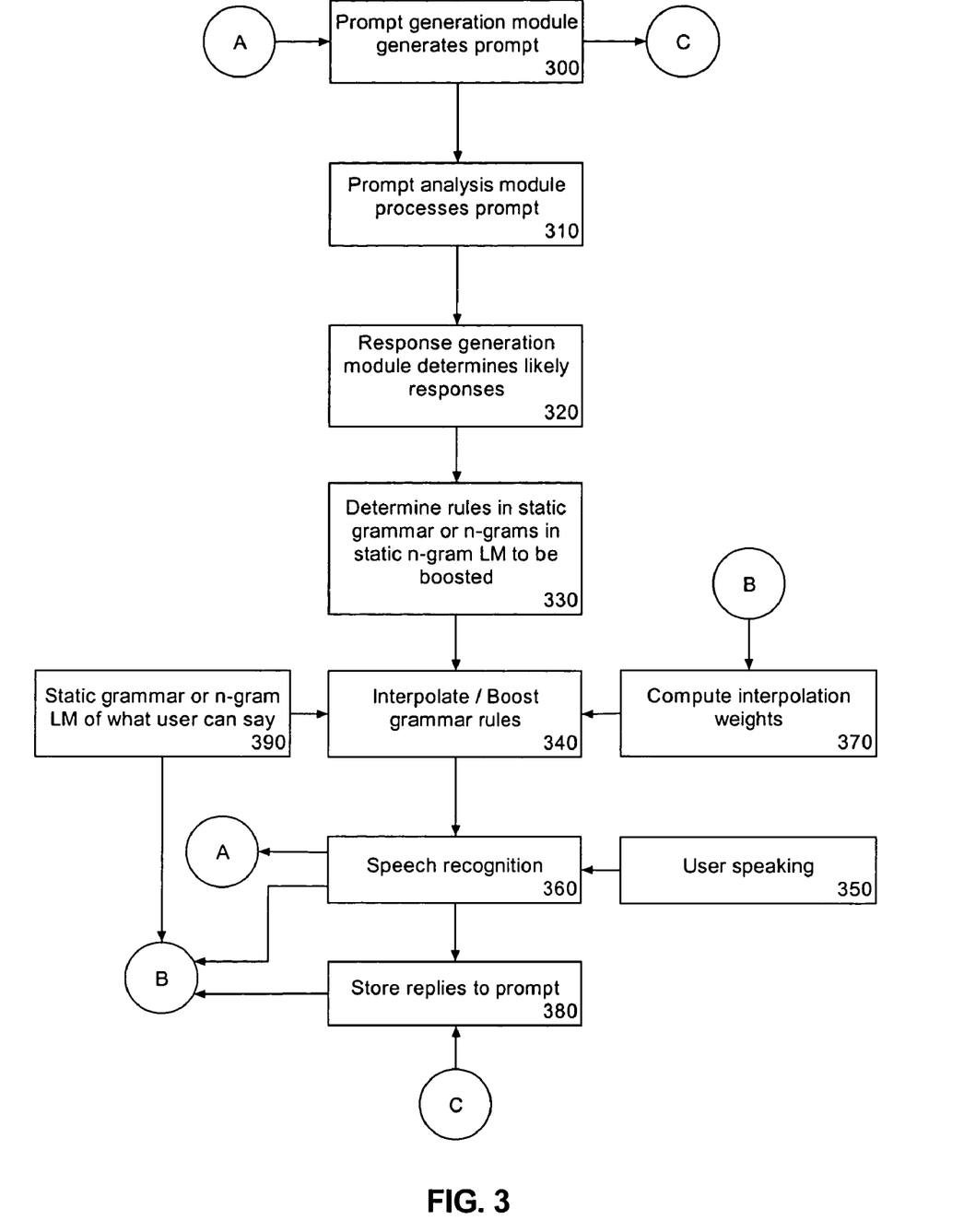
FIG. 3 is a flow chart illustrating a method for biasing a speech recognizer based on prompt context in accordance with yet another embodiment of the present invention.

FIG. 3 is a flow chart illustrating a method for biasing a speech recognizer based on prompt context in accordance with another embodiment of the present invention. The method may begin in step 300 wherein the prompt generation module generates a prompt for the user. Then, in step 310, a prompt analysis module processes the prompt and, in step 320, a response generation module determines responses the user might say in response to the prompt generated in step 300.

Then, in step 330, the system determines rules within a static grammar or the n-grams in a static n-gram LM to be boosted or increased. In step 340, the system interpolates the grammar rules and boosts probabilities of selected grammar rules such that when the user speaks, step 350, the system has an increased likelihood of recognizing the speech in step 360. The grammar rules can be interpolated using interpolation weights 370 and a static grammar or n-gram LM of things the user might say 390. At that point, the speech recognition may return to step 300. The system also stores the prompt and replies to the prompt from the user at 380. Additionally, after speech recognition 360, the interpolation weights may be adjusted based upon the user's response.

Figure 4:
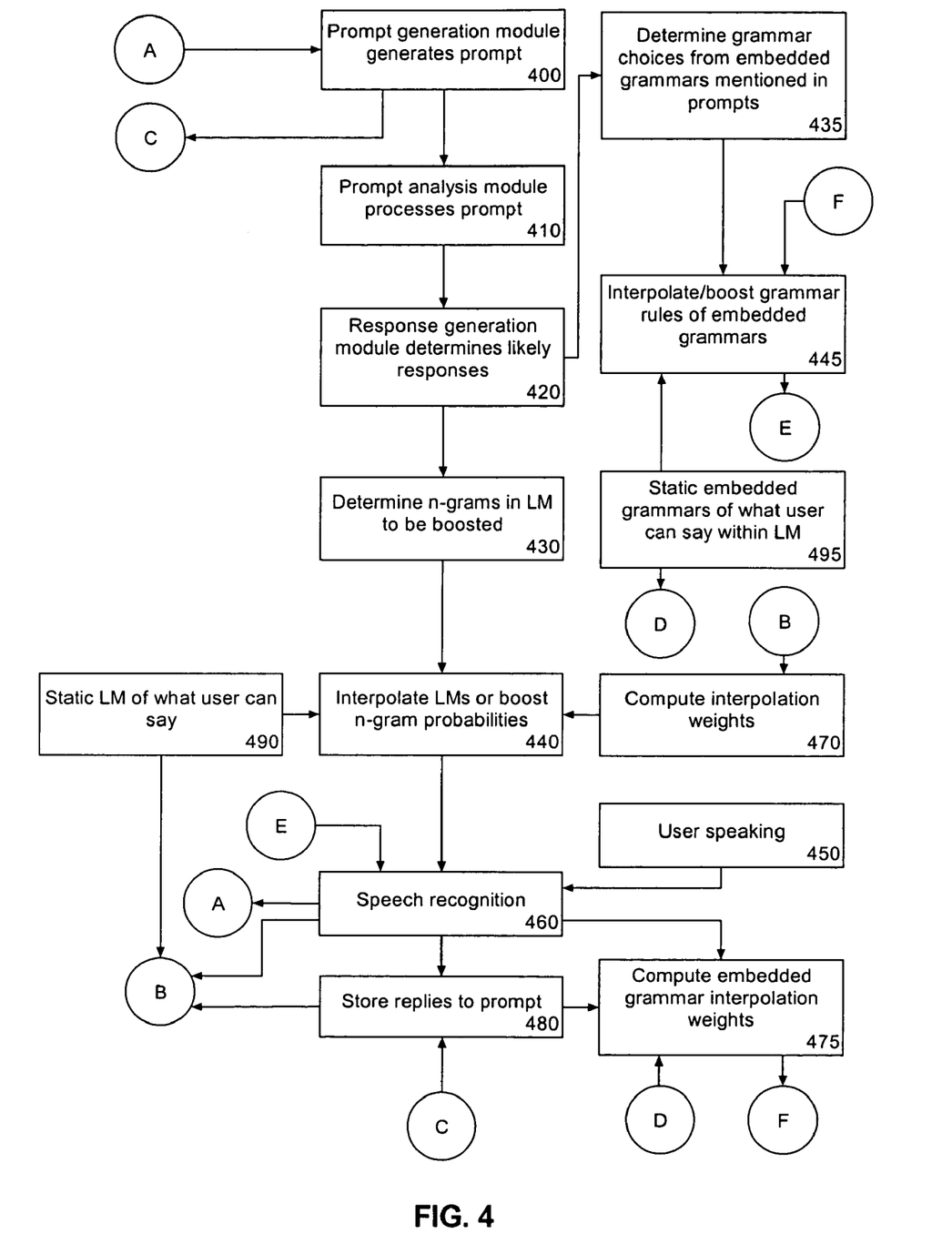
FIG. 4 is a flow chart illustrating a method for biasing a speech recognizer based on prompt context in accordance with still another embodiment of the present invention.

FIG. 4 is a flow chart illustrating a method for biasing a speech recognizer based on prompt context in accordance with another embodiment of the present invention. The method may begin in step 400 wherein the prompt generation module generates a prompt for the user. Then, in step 410, a prompt analysis module processes the prompt and, in step 420, a response generation module determines responses the user might say in response to the prompt generated in step 400.

In step 435, grammar choices can be determined from embedded grammars mentioned or referenced in the prompts. The grammars can be interpolated or the probabilities of rules of one or more of the embedded grammars can be boosted in step 445. Static embedded grammars specifying what the user can say, or the allowable user responses, step 495, can be provided as input to step 445.

In step 430, the system determines n-grams in the LM to be boosted or increased. In step 440, the system interpolates LMs or boosts n-gram probabilities, such that when the user speaks, step 450, the system has an increased likelihood of recognizing the speech in step 460. The interpolation grammar interpolates using interpolation weights 470 and a static LM of things the user might say 490. At that point, the method may return to step 400. The system also stores the prompt and replies to the prompt recognized by the system at 480. Additionally, after speech recognition 460, the interpolation weights may be adjusted based upon the recognized response. Continuing from step 480 to step 475, embedded grammar interpolation weights can be computed.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method of biasing a speech recognition system at a lexical level based on prompt context comprising:
    prompting a user for a response
    analyzing words used in the prompt given to the user;
    determining a set of words the user is likely to use when responding to the prompt based on the analyzing step, wherein the word set is determined using a speech recognition system strategy including at least one of n-gram language models and grammars; and
    boosting probabilities of the determined set of words in a response from the user to the prompt by an adjustable predetermined amount such that a speech recognizer of the speech recognition system has an increased likelihood of recognizing the response from the user.

2. The method of claim 1, wherein the step of determining a response set comprises:
    inverting question-asking syntax into a response syntax;
    including at least one choice mentioned to the user; and
    utilizing at least one additional constituent mentioned in the prompt.

3. The method of claim 1, wherein an interpolated grammar is formed by inducing a grammar from the response set and interpolating with a static grammar of what responses the user might say at any time.

4. The method of claim 3, wherein the interpolated grammar has weights of the responses and grammars adjusted therein based upon previous responses to the prompt.

5. The method of claim 3, wherein the interpolated grammar is used for future responses.

6. The method of claim 3, wherein the interpolated grammar is reset to the static grammar after the user responds to the prompt.

7. The method of claim 3, wherein the interpolated grammar is reset to the static grammar after the user cancels a prompt and resets the system to generate a new prompt.

8. The method of claim 1 wherein a probabilistically adjusted grammar is formed by adapting a static grammar modeling of responses the user might say at any time to the phrases in the response set to boost the probability of predicting phrases in the response set by the static grammar.

9. The method of claim 8, wherein the probabilistically adjusted grammar is reset to the static grammar after the user responds to the prompt.

10. The method of claim 8, wherein the probabilistically adjusted grammar is reset to the static grammar after the user cancels a prompt and resets the system to generate a new prompt.

11. The method of claim 1 wherein an interpolated n-gram language model is formed by inducing a language model from the response set and interpolating with a static n-gram language model of responses the user might say at any time.

12. The method of claim 11, wherein the interpolated n-gram language model has weights of the induced language model and static language model adjusted therein based upon previous responses to the prompt.

13. The method of claim 11, wherein the interpolated n-gram language model is used for future responses.

14. The method of claim 13, wherein the interpolated n-gram language model is reset to the static n-gram language model after the user responds to the prompt.

15. The method of claim 13, wherein the interpolated n-gram language model is reset to the static n-gram language model after the user cancels a prompt and resets the system to generate a new prompt.

16. The method of claim 1, wherein an adapted n-gram language model is formed by adapting a static n-gram language model of responses the user might say at any time with phrases in the response set to boost the probability of predicting phrases in the response set by the static n-gram language model.

17. The method of claim 16, wherein the adapted n-gram language model has weights of the adapted language model and static language model adjusted therein based upon previous responses to the prompt.

18. The method of claim 16, wherein the adapted n-gram language model is used for future responses.

19. The method of claim 18, wherein the adapted n-gram language model is reset to the static n-gram language model after the user responds to the prompt.

20. The method of claim 18, wherein the adapted n-gram language model is reset to the static n-gram language model after the user cancels a prompt and resets the system to generate a new prompt.

21. The method of claim 1, wherein the speech recognition system strategy uses n-gram language models with embedded grammars for named entries.

22. The method of claim 21, wherein the n-gram language models with embedded grammars strategy comprises:
    creating an interpolated n-gram language model that is formed by interpolating the response set and with a static n-gram language model of responses the user might say at any time;
    analyzing responses in the response set to determine values mentioned for the embedded grammars; and
    creating new embedded grammars from values mentioned in the prompt using one additional step;
    wherein the additional step is selected from:
        a) inducing new embedded grammars from the response set and interpolating with a static grammar of what responses the user might say at any time to form interpolated embedded grammars; and
        b) adapting static embedded grammars modeling of responses the user might say at any time is with phases in the response set to boost the probability of predicting phases in the response set by the static grammar to form probabilistically adjusted embedded grammars.

23. The method of claim 22, wherein the additional step is inducing new embedded grammars from the response set and interpolating with a static grammar of what responses the user might say at any time to form interpolated embedded grammars;
    further wherein the interpolated n-gram language model has weights of the responses adjusted therein based upon previous responses to the prompt.

24. The method of claim 23, wherein the interpolated n-gram language model is used for future responses.

25. The method of claim 24, wherein the interpolated n-gram language model is reset to the static n-gram language model after the user responds to the prompt.

26. The method of claim 24, wherein the interpolated n-gram language model is reset to the static n-gram language model after the user cancels a prompt and resets the system to generate a new prompt.

27. The method of claim 23, wherein the interpolated embedded grammars have weights of the responses adjusted therein based upon previous responses to the prompt.

28. The method of claim 23, wherein the interpolated embedded grammars are used for future responses.

29. The method of claim 23, wherein the interpolated embedded grammars are reset to the static grammar after the user responds to the prompt.

30. The method of claim 23, wherein the interpolated embedded grammar are reset to the static grammar after the user cancels a prompt and resets the system to generate a new prompt.

31. The method of claim 22, wherein the additional step is adapting static embedded grammars modeling of responses the user might say at any time is with phrases in the response set to boost the probability of predicting phrases in the response set by the static grammar to form probabilistically adjusted embedded grammars;
further wherein the interpolated n-gram language model has weights of the responses adjusted therein based upon previous responses to the prompt.

32. The method of claim 31, wherein the interpolated n-gram language model is used for future responses.

33. The method of claim 32, wherein the interpolated n-gram language model is reset to the static n-gram language model after the user responds to the prompt.

34. The method of claim 32, wherein the interpolated n-gram language model is reset to the static n-gram language model after the user cancels a prompt and resets the system to generate a new prompt.

35. The method of claim 31, wherein the probabilistically adjusted embedded grammars are reset to the static grammar after the user responds to the prompt.

36. The method of claim 31, wherein the probabilistically adjusted embedded grammars are reset to the static grammar after the user cancels a prompt and resets the system to generate a new prompt.

37. The method of claim 21, wherein the n-gram language models with embedded grammars strategy comprises:
creating an adapted n-gram language model that is formed by adapting a static n-gram language model of responses the user might say at any time is adapted with phrases in the response set to boost the probability of predicting phrases in the response set by the static n-gram language model;
analyzing responses in the response set to determine values mentioned for the embedded grammars; and
creating new embedded grammars from values mentioned in the prompt using one additional step;
wherein the additional step is selected from:
a) inducing new embedded grammars from the response set and interpolating with a static grammar of what responses the user might say at any time to form interpolated embedded grammars; and
b) adapting static embedded grammars modeling of responses the user might say at any time is with phrases in the response set to boost the probability of predicting phrases in the response set by the static grammar to form probabilistically adjusted embedded grammars.

38. The method of claim 37, wherein the additional step is inducing new embedded grammars from the response set and interpolating with a static grammar of what responses the user might say at any time to form interpolated embedded grammars;
further wherein the adapted n-gram language model is reset to the static n-gram language model after the user responds to the prompt.

39. The method of claim 37, wherein the additional step is inducing new embedded grammars from the response set and interpolating with a static grammar of what responses the user might say at any time to form interpolated embedded grammars;
further wherein the adapted n-gram language model is reset to the static n-gram language model after the user cancels a prompt and resets the system to generate a new prompt.

40. The method of claim 37, wherein the additional step is inducing new embedded grammars from the response set and interpolating with a static grammar of what responses the user might say at any time to form interpolated embedded grammars;
further wherein the interpolated embedded grammars have weights of the responses adjusted therein based upon previous responses to the prompt.

41. The method of claim 37, wherein the additional step is inducing new embedded grammars from the response set and interpolating with a static grammar of what responses the user might say at any time to form interpolated embedded grammars;
further wherein the interpolated embedded grammars are used for future responses.

42. The method of claim 37, wherein the additional step is inducing new embedded grammars from the response set and interpolating with a static grammar of what responses the user might say at any time to form interpolated embedded grammars;
further wherein the interpolated embedded grammars are reset to the static grammar after the user responds to the prompt.

43. The method of claim 37, wherein the additional step is inducing new embedded grammars from the response set and interpolating with a static grammar of what responses the user might say at any time to form interpolated embedded grammars;
further wherein the interpolated embedded grammars are reset to the static grammar after the user cancels a prompt and resets the system to generate a new prompt.

44. The method of claim 37, wherein the additional step is adapting static embedded grammars modeling of responses the user might say at any time is with phrases in the response set to boost the probability of predicting phrases in the response set by the static grammar to form probabilistically adjusted embedded grammars;
further wherein the adapted n-gram language model is reset to the static n-gram language model after the user responds to the prompt.

45. The method of claim 37, wherein the additional step is adapting static embedded grammars modeling of responses the user might say at any time is with phrases in the response set to boost the probability of predicting phrases in the response set by the static grammar to form probabilistically adjusted embedded grammars;

further wherein the adapted n-gram language model is reset to the static n-gram language model after the user cancels a prompt and resets the system to generate a new prompt.

46. The method of claim 37, wherein the additional step is adapting static embedded grammars modeling of responses the user might say at any time is with phrases in the response set to boost the probability of predicting phrases in the response set by the static grammar to form probabilistically adjusted embedded grammars;

further wherein the probabilistically adjusted embedded grammars are reset to the static grammar after the user responds to the prompt.

47. The method of claim 37, wherein the additional step is adapting static embedded grammars modeling of responses the user might say at any time is with phrases in the response set to boost the probability of predicting phrases in the response set by the static grammar to form probabilistically adjusted embedded grammars;

further wherein the probabilistic ally adjusted embedded grammars are reset to the static grammar after the user cancels a prompt and resets the system to generate a new prompt.

* * * * *